Feb. 24, 1959
H. E. BALSIGER
2,874,518
CONCENTRIC LOADER
Filed March 4, 1954
4 Sheets-Sheet 1
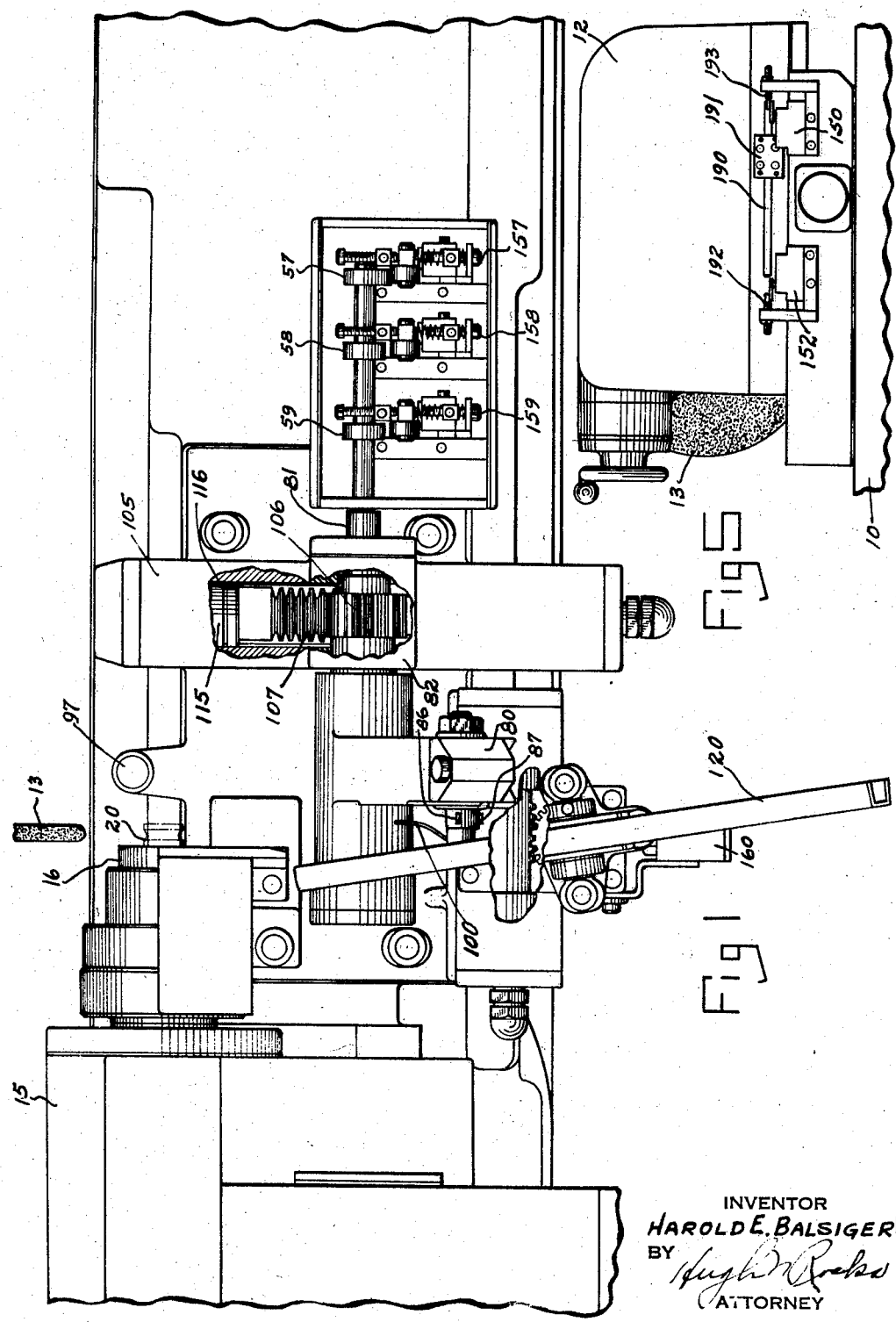
INVENTOR
HAROLD E. BALSIGER
BY
ATTORNEY

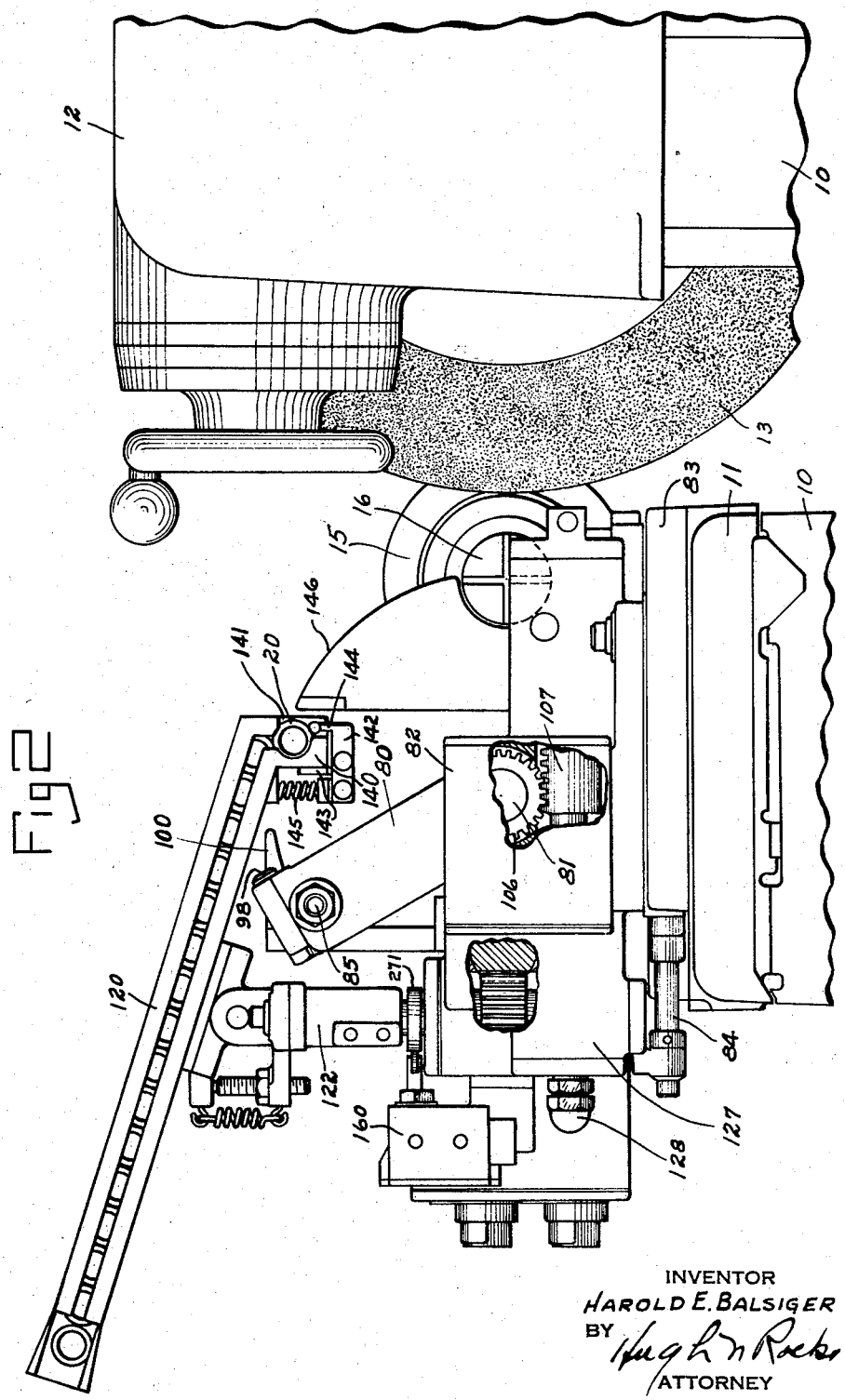

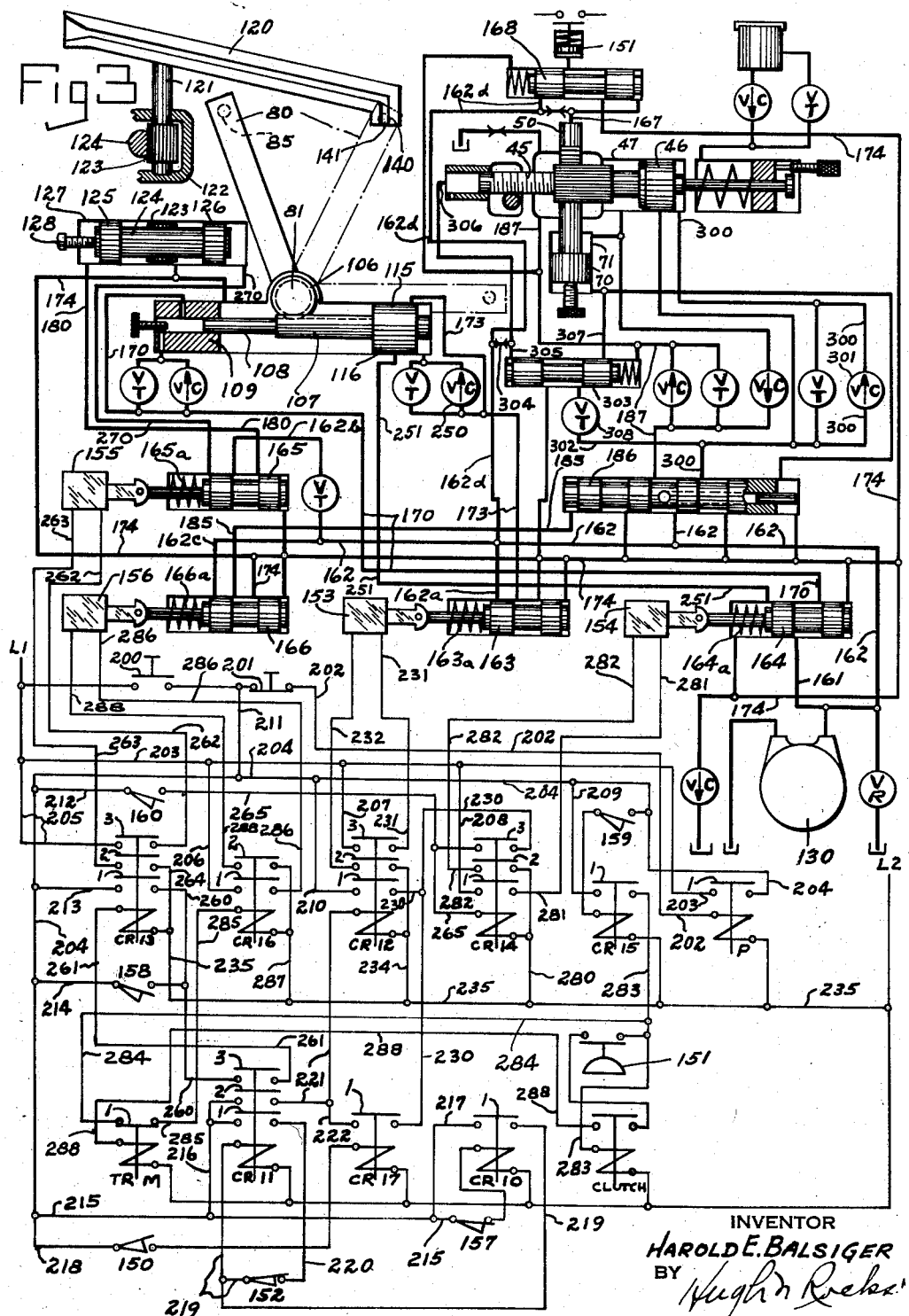

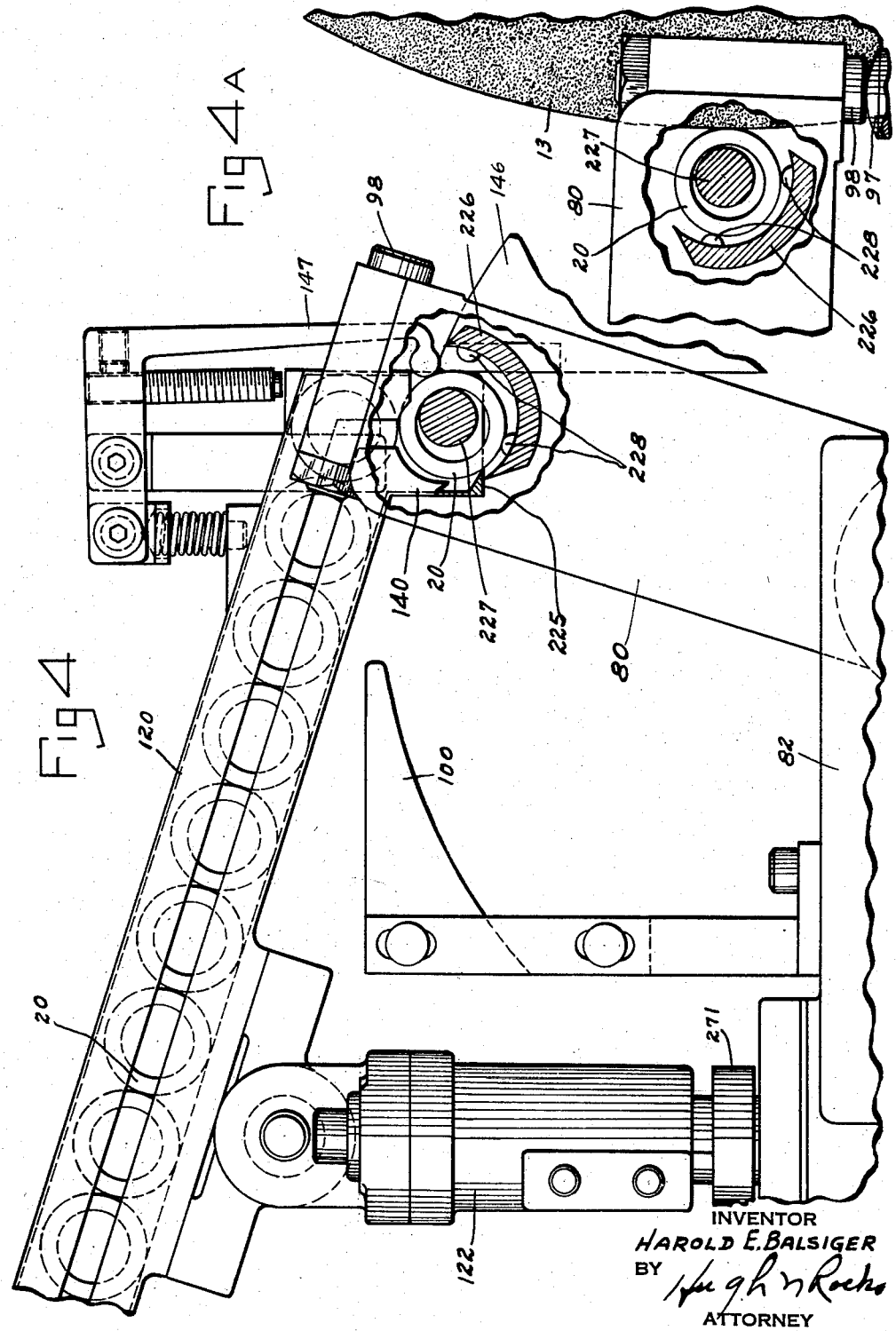

United States Patent Office 2,874,518
Patented Feb. 24, 1959

2,874,518

CONCENTRIC LOADER

Harold E. Balsiger, Waynesboro, Pa., assignor to Landis Tool Company, Waynesboro, Pa.

Application March 4, 1954, Serial No. 414,198

16 Claims. (Cl. 51—103)

This invention relates to a machine for grinding ring-like work pieces and particularly to apparatus for introducing such work pieces into and removing them from the machine.

It is an object of this invention to provide an improved loading mechanism in which the work piece is automatically placed on a supporting member in inoperative position, the supporting member then being moved automatically into position for grinding.

A further object is to provide means for automatically placing a work piece on a supporting member and thereafter moving the supporting member to place the work piece in grinding position.

Another object is to provide means for locating the supporting member in a position to receive an unground work piece.

Another object is to provide means for removing a finished work piece from the supporting member.

In the drawings, Figure 1 is a partial plan view showing an apparatus for automatically placing unground work pieces on a magnetic chuck and for removing work pieces after a grinding operation on a machine of the type disclosed in Patent 2,694,883, granted November 23, 1954.

Figure 2 is a right hand end view showing the loader with sections broken away to show structural details.

Figure 3 is a hydraulic and an electric diagram.

Figure 4 is a close-up end elevation partially cut away and in section, of a work support member which engages the outside diameter of a work piece.

Figure 4A is a partial end elevation showing the work supporting elements in grinding position.

Figure 5 is an end elevation showing elements actuated by wheel base movement.

Numeral 10 indicates the bed of a machine on which are mounted a carriage 11 and wheel base 12. A grinding wheel 13 is rotatably mounted on said wheel base. A feed mechanism of the type shown in Patent 2,335,356, granted November 30, 1943, and including improvements of the type disclosed in Patent 2,486,244, granted October 25, 1949, serves to feed the grinding wheel relative to the work during the grinding operation.

A headstock 15 having a magnetic chuck 16 rotatably mounted thereon is supported on carriage 11. The means for moving a work piece 20 into operation with the magnetic chuck 16 is similar to apparatus disclosed in Patent 2,694,883. It consists of arm 80 pivotally mounted on shaft 81 on a bracket 82 attached to carriage 11. At the outer end of arm 80 and axially parallel with the headstock is a stub arbor 85 having peripherally spaced shoes 86 and 87 for engaging a ring-like work piece 20 and supporting same for a grinding operation against the rotating force exerted by the magnetic chuck and the grinding operation of the grinding wheel. A fixed stop 97 on the bracket and an adjustable stop 98 on the arm 80 serve to locate the arm in proper relation to the headstock spindle. The bracket 82 is slidably mounted on a base member 83 on which it may be adjusted transversely toward and from the grinding wheel by means of an adjusting screw 84. When arm 80 is moved to withdraw a finished work piece it carries the work piece past a flexible finger 100 which engages the work piece in such a manner as to remove it from the arbor 85 and drop it into a suitable receptacle.

The apparatus of the present invention is automatically operated and includes a feeder for supplying work to arbor 85. The shaft 81 extends beyond the means for supporting arm 80 and passes through a housing 105. Pinion 106 is mounted on said shaft in said housing. Pinion 106 engages a rack 107 having a small piston portion 108 and cylinder 109 at one end thereof and a larger piston 115 in cylinder 116 at the other end.

A further extension of shaft 81 has spaced cams 57, 58 and 59 thereon for actuating limit switches 157, 158 and 159 respectively.

The means for supplying work pieces to arm 80 consists of an inclined chute 120 pivotally mounted on vertical shaft 121. Said shaft passes through housing 122 and is secured to a pinion 123 in said housing. Said pinion engages a rack 124 having pistons 125 and 126 on opposite ends thereof in cylinder 127. An adjusting screw 128 in the left end of cylinder 127 serves as a stop for the movement of piston 126 and hence of chute 120 toward the arm 80. The lower end of said chute has a vertical portion 140 into which a work piece is dropped into a position in alignment with the arbor 85. An opening 141 in the front of said vertical portion permits the removal of a work piece laterally by the movement of arbor 85 or arm 80. A work piece 20 is yieldingly held in this position by means of an escapement device which consists of an arm 142 pivoted to said vertical portion 143. A vertical extension 144 of said arm at the right hand end thereof engages the work piece in such a manner as to prevent removal of the work piece from the chute. However, the other end of arm 142 is urged in a counter-clockwise direction by means of a spring 145 between said arm and the under side of the chute 120. In Figure 4 the inverted escapement device is substantially identical with that shown in Figure 2 except for an elongated work engaging portion 147. Said work engaging portion holds a work piece 20 against a detent 225 at the bottom of vertical portion 140 of chute 120. Arm 80 in this figure has a work supporting member 226 which engages the outside diameter of the work piece. A pin 227 on said arm receives the work piece from feeder chute 120 and removes said work piece laterally against the work engaging portion 147. When arm 80 reaches the position shown in Figure 4A, the support of the work piece is transferred from pin 227 to arcuately spaced shoes 228 on support member 226.

*Operation*

Fluid is supplied by pump 130 through line 161 to valve 164 and through line 162 and line 162a to valve 163. Line 162 also distributes fluid under pressure through line 162b to valve 165 and through line 162c to valve 166. Line 162d conducts fluid under pressure from line 162 to slow feed jet 167 and slow feed jet valve 168.

At the beginning of a grinding cycle, solenoids 153, 154, 155 and 156 are de-energized. The valves 163, 164, 165 and 166 respectively, actuated by said solenoids, are held in right hand position by springs 163a, 164a, 165a and 166a respectively.

Valve 164 in this position directs fluid from line 161 through line 170 to cylinder 109 to shift piston 108, rack 107 and piston 115 on cylinder 116 to the right. This movement of rack 107 rotates pinion 106 and arm 80 in a counterclockwise direction to the position of arm 80 indicated by a solid line in Figure 3.

With valve 163 in its right hand position, line 173 connects the end of cylinder 116 through said valve, with exhaust passage 174.

Valve 165, in its right hand position, directs fluid under pressure from line 162b through line 180 to the left end of cylinder 127. Piston 126 in said cylinder is moved to, or held in the right hand position and through rack 124, pinion 123, and vertical shaft 121 holds chute 120 in retracted position.

In the right hand position of valve 166 line 185 from the left end of rapid feed valve 186 is connected to exhaust line 174.

In the left hand position of valve 186, fluid is directed through line 187 to the left end of rapid feed cylinder 47 and to the rod end of slow feed cylinder 71 to hold rapid feed piston 46 and slow feed piston 70 in reset position.

The cycle of operations is initiated by closing start switch 200 which completes a circuit from L1 through stop switch 201 and line 202 to energize relay P. Contact 1 of relay P completes a circuit from L1 through line 203 and said contact to line 204. From line 203 there are direct connections to each of several relays. Line 205 leads from line 203 to contact 3 of CR13. Line 206 connects line 203 with contact 1 of CR16. Line 207 connects line 203 with contact 3 of CR12. Line 208 connects line 203 with contact 1 of CR14.

Line 204 also serves as a trunk line connecting line 203 through contact 1 of P. Line 209 connects line 204 with contact 1 of CR15. Line 210 connects line 204 with contact 1 of CR12. Line 211 connects line 204 to the left side of stop switch 201 to provide a holding circuit for relay P. Line 212 connects line 204 with one side of feeder LS160. Line 213 connects line 204 with contact 1 of CR13. Line 214 connects line 204 with one side of LS158. Line 215 connects line 204 through line 216 to contacts 1 and 2 of CR11 and through line 217 to contact 1 of CR10. Line 215 connects line 204 with unload LS157. Line 218 connects line 204 with wheel base and LS150. When relay P is closed a circuit is completed through lines 204, 215, and LS157 which is held closed by cam 57 on shaft 81 to energize CR10. Contact 1 of CR10 completes a circuit from line 217 through line 219 to LS152 and CR11. Contact 1 of CR11 completes a circuit through line 220 to normally closed LS152 and line 219 to hold CR11. Contact 2 of CR11 completes a circuit from line 216 and line 221 to CR12 and through line 222 to contact 1 of CR 17. The circuit through contact 3 of CR11 is not completed until CR13 is energized.

Contact 1 of CR12 completes a circuit from line 210 through line 230 to contact 3 of CR14. Contacts 2 and 3 of CR12 complete circuits from line 202, line 207 and line 231 to solenoid 153 and from solenoid 153 through line 232, contact 2 of CR12, line 234 and line 235 to L2. Solenoid 153 shifts valve 163 to the left, connecting pressure line 162 through line 162a, line 173 and check valve 250 to the head end of cylinder 116. Piston 115 moves to the left and uncovers a port supplied by line 173. This movement of piston 115 causes loader 80 to move in a clockwise direction until said piston opens a port to line 251 which is connected through valve 164 to exhaust passage 174. At this point the pressure in cylinder 109 acting on piston 108 prevents further movement of arm 80. Piston 115 opens the port to line 251 just enough to maintain a pressure against itself to balance the pressure in cylinder 109. Arm 80 is thus stopped in position to receive a work piece, and cam 58 on loader shaft 81 closes LS158 to complete a circuit from line 204 and line 214 through line 260, contact 3 of CR11 and line 261 to CR13.

In this position of shaft 81 and arm 80, cam 57 releases LS157 de-energizing CR10 and opening the circuit through contact 1 thereof to CR11. However, CR11 is held through its own contact 1 and wheel base LS152.

Contact 1 of CR13 completes a circuit from 204 through line 213 and line 260 to hold CR13. Contacts 2 and 3 complete circuits from line 203 and line 205 through line 262 to feeder solenoid 155 and from said solenoid through line 263, contact 2, lines 264 and 235 to L2. Solenoid 155 shifts valve 165 to the left, connecting pressure line 162b through line 270 to the right hand end of feeder cylinder 127. Feeder piston 126 moves to the left swinging chute 120 in a clockwise direction to place a work piece on arbor 85.

This movement of piston 126 acts through cam 271 on shaft 121 to close feeder LS160. LS160 completes a circuit from line 204 through line 212 and line 265 to energize CR14. Contacts 1 and 2 of CR14 connect lines 203 and 208 from L1 and line 280 through line 235 from L2 through lines 281 and 282 respectively to solenoid 154.

Solenoid 154 shifts valve 164 to the left connecting pressure line 161 through line 251 to cylinder 116 thus increasing the pressure on piston 115 and continuing the movement of loader arm 80 in a clockwise direction. Work piece 20 is thus moved laterally out of the chute 120 against spring 145 acting through arm 142. Guide plate 146 holds work piece 20 on arbor 85 in the proper axial position to slide on to magnetic chuck 16.

This last movement of arm 80 and shaft 81 serves to close LS159 by means of cam 59 on said shaft. LS159 completes a circuit from line 204 to CR15. Contact 1 of CR15 completes a circuit from line 204 through line 209 and line 283 to the timer clutch coil. Line 284 with normally closed contact 1 of TRM is in turn connected through line 285 to energize CR16. Contacts 1 and 2 of CR16 connect L1 through line 206 and line 286 and L2 through lines 287, 235 and line 288 with solenoid 156.

Solenoid 156 shifts valve 166 to the left connecting pressure line 162c through line 185 to the left end of rapid feed valve 186. Valve 186 is shifted to the right, connecting line 162 through line 300 and check valve 301 to the head end of rapid feed cylinder 47 shifting rapid feed piston 46 to the left to move wheel base 12 and grinding wheel 13 toward work piece 20. At the same time valve 186 directs fluid through line 302 to jet pressure valve 303. Fluid under pressure from line 162d is supplied through restriction 304 and line 305 to the left end of valve 303 and also to rapid feed jet 306.

When wheel support 12 moves forward, a rod 190 supported frictionally in block 191 on wheel base 12 releases normally closed LS150 which closes a circuit from line 204 through line 218 to energize CR17. Contact 1 of CR17 provides a second holding circuit for CR12 which through line 230 and contact 3 of CR14 serves to hold CR14. As the position of wheel base 12, relative to bed 10, advances to compensate for wheel wear and dressing, the position of rod 190 in block 191 is adjusted by engagement thereof with stops 192 and 193.

At the end of its rapid movement, rod 190 on wheel base 12 releases LS152 de-energizing CR11 which in turn de-energizes CR13. CR13 de-energizes solenoid 155. Valve 165 is then moved to the right by spring 165a and fluid under pressure from line 162b is directed through line 180 to the left end of feeder cylinder 127 moving piston 126 to the right and shifting chute 120 to inoperative position.

When the end of feed screw 45 blocks the escape of fluid from jet 306, pressure is exerted against valve 303 to shift it to the right. In the right hand position of valve 303, fluid under pressure from line 302 is supplied through throttle valve 308 and line 307 to the head end of slow feed cylinder 71 to start the grinding feed by rotating feed screw 45. Near the end of the grinding operation as piston 70 nears the end of its movement piston rod 50 blocks the escape of fluid from slow feed jet 167 and builds up pressure at the right hand end of slow feed jet valve 168 moving said valve to the left. In this position of valve 168 fluid under pressure from line 162d is directed to slow feed jet pressure switch 151.

Pressure switch 151 completes a circuit from line 283 through line 288 to energize TRM. After a predetermined interval during which the sparkout grinding takes place, TRM opens contact 1 to de-energize CR16.

De-energizing CR16 also de-energizes solenoid 155 permitting spring 165a to shift valve 165 to the right and reset feed pistons 46 and 70 and thus retract wheel support 12. Movement of wheel support 12 to the rear, through rod 190, opens LS150 to de-energize CR17. Rod 190 also opens LS152 to de-energize CR11. LS152 is opened as soon as the retracting movement of the wheel base begins so that CR11 is de-energized immediately. However, CR12 is held by CR17 which is not de-energized by LS150 until the wheel base is in withdrawn position.

I claim:

1. A grinding machine comprising a bed, a work support mounted on said bed, a grinding wheel support slidably mounted on said bed, a grinding wheel rotatably mounted on said wheel support, means for effecting relative transverse feeding movement between said supports, a loading device having means for receiving a work piece in inoperative position and tranferring same to grinding position, a feeder for supplying work pieces to said loading device and control means actuated by movement of said loading device for actuating the feeder and starting the transverse feeding movement.

2. In a grinding machine, a work loading device having means for receiving a work piece and transferring said work piece to grinding position having an arm and means for moving said arm comprising a piston and cylinder, means for supplying fluid to one end of said cylinder including axially spaced ports, a valve for connecting one of said ports alternately with a pressure and an exhaust line, whereby fluid supplied through one of said ports will cause said piston to move until it uncovers the other port, said valve being normally positioned to connect said port to said exhaust line thus stopping the loading arm in position to receive a work piece and means operable thereafter to change the connection of said port to said pressure line whereby to continue the movement of said piston to shift said arm into grinding position.

3. In a grinding machine for grinding ring-like work pieces, a work loading device having means for receiving a work piece and transferring same to grinding position, including an arm having means thereon for engaging and supporting a work piece on the internal surface thereof, means for moving said arm comprising a piston and cylinder, means for conducting fluid under pressure to one end of said cylinder including axially spaced ports, a valve for connecting one of said ports alternately with a pressure and an exhaust line whereby fluid supplied through one of said ports will cause said piston to move until it uncovers the other port, said valve being normally positioned to connect said port to said exhaust line, thus stopping the loading arm in position to receive a work piece and means operable thereafter to change the connection of said port to said pressure line whereby to continue the movement of said piston to shift said arm into grinding position.

4. In a grinding machine, a work loading device having means for receiving a work piece and transferring same to grinding position having an arm and means for moving said arm comprising a piston and cylinder, means for supplying fluid to one end of said cylinder including axially spaced ports, a valve for connecting one of said ports alternately with a pressure and an exhaust line, whereby fluid supplied through one of said ports will cause said piston to move until it uncovers the other port, said valve being normally positioned to connect said port to said exhaust line thus stopping the arm in position to receive a work piece and, a feeding device movable for supplying work pieces to said arm when said arm is in work receiving position and control means actuated by said feeding device for changing the connection of said port to said pressure line whereby to continue the movement of said piston to remove a work piece from said feeding device and place it in grinding position.

5. In a grinding machine for grinding ring-like work pieces, a work loading device having means for receiving a work piece and transferring said work piece to grinding position including an arm having means thereon for engaging the internal surface of the work piece to move said work piece laterally into grinding position, said arm having additional means thereon for engaging the external surface of the work piece at peripherally spaced points for supporting said work piece during a grinding operation.

6. In a grinding machine, a bed, a work support thereon, means for rotatably supporting a work piece on said work support including a headstock, a magnetic chuck on said headstock, a grinding wheel support slidably mounted on said bed for movement transversely toward and from said headstock, a grinding wheel rotatably mounted on said support, a feed mechanism for providing said transverse movement, means for placing unground work pieces on said chuck and removing ground pieces therefrom including a transversely movable member having means for receiving a work piece in a loading position and carrying said work piece into engagement with said magnetic chuck and supporting same against the driving action of said chuck and headstock and the grinding action of said grinding wheel, a feeder for work pieces, means responsive to movement of said work receiving member to move said feeder into operative relation therewith, whereby to transfer a work piece to said work receiving mechanism, means responsive to said movement of said feeder to resume the movement of said work receiving member to place a work piece on said chuck, means operable in response to said last movement of said work receiving member for actuating said feed mechanism, means operable at the end of a grinding operation to reverse the movement of said work receiving member and means for engaging a finished work piece during said reverse movement and removing same from said member.

7. In a grinding machine, a work loading device having means for receiving a work piece and transferring said work piece to grinding position including an arm and means for moving said arm comprising a piston and cylinder, means for supplying fluid to one end of said cylinder to move said arm to a predetermined position, means in said cylinder to stop said movement of said arm in said predetermined position and means operable thereafter to continue the movement of said piston to shift said arm into grinding position.

8. In a grinding machine, a work loading device having means for receiving a work piece and transferring said work piece to grinding position including an arm and means for moving said arm from an inoperative position to a work receiving position including a hydraulic motor which is connected to said arm, means for applying pressure simultaneously to both ends of said piston, an intermediate port in said cylinder normally connected with an exhaust passage and means for stopping said arm in work receiving position when said port is partially covered by said motor, means for thereafter controlling the fluid supply to said motor whereby to move said arm with a work piece into grinding position.

9. In a grinding machine, a work loading device having means for receiving a work piece and transferring said work piece to grinding position including an arm, a hydraulic motor for moving said arm, means for stopping said arm in a position to receive a work piece including a valve, a feeding device movable for supplying a work piece to said arm when said arm is in work receiving position and control means actuated by said feeding device for shifting said valve to effect continuation of the movement of said motor and said arm to remove a work piece from said feeding device and place said work piece in grinding position.

10. In a grinding machine, a work loading device having means for receiving a work piece and transferring said work piece to grinding position including an arm and means for moving said arm comprising a piston and cylinder, means for supplying fluid to one end of said cylinder including axially spaced ports, a valve for connecting one of said ports alternately with a pressure and an exhaust line, whereby fluid supplied through one of said ports will cause said piston to move until it uncovers the other port, said valve being normally positioned to connect said port to said exhaust line thus stopping the loading arm in position to receive a work piece.

11. In a grinding machine for grinding cylindrical work pieces having an internal and an external cylindrical surface, a grinding wheel and means for rotating same, a work drive spindle and means for rotating same, a magnetic chuck on said spindle for holding and rotating a work piece, movably mounted work supporting means having a portion thereon for engaging one of said cylindrical surfaces and moving a work piece transversely in a path adjacent to and parallel with the face of said chuck to slide said work piece into operative engagement with said magnetic chuck, and means for engaging the other of said cylindrical surfaces for peripherally supporting said work piece as it rotates with said chuck.

12. In a grinding machine for grinding ring-like work pieces, a work drive spindle and means for rotating same, a magnetic chuck on said spindle for holding and rotating a work piece, a work loading device having means for receiving a work piece and transferring said work piece to grinding position including an arm for sliding said work piece transversely into operative engagement with said chuck, work engaging means on said arm, said work engaging means comprising angularly spaced portions for engaging and supporting said work piece on the external peripheral surface thereof during rotation by said chuck.

13. In a grinding machine, a bed, a work support thereon, means for rotatably supporting a workpiece on said work support including a headstock, a grinding wheel support slidably mounted on said bed for movement transversely toward and from said headstock, a grinding wheel rotatably mounted on said support, means for placing unground workpieces in said machine and removing ground workpieces therefrom including a transversely movable member having a grinding position and an unloading position, an intermediate loading position between said first two positions, actuating means for shifting said member from said grinding position to said unloading position in a single movement, and means for stopping said actuating means with said member in said intermediate loading position during movement of said member in the opposite direction.

14. In a grinding machine, a work loading device having means for receiving a workpiece and transferring said workpiece to grinding position including an arm, power means for moving said arm between an unloading position and said grinding position, control means for stopping movement of said arm in an intermediate work receiving position, and means operable thereafter to continue the movement of said arm to said grinding position.

15. In a grinding machine, a base, a grinding wheel support movable transversely on said base, a grinding wheel rotatably mounted on said support, a work table movable longitudinally on said base, a headstock on said table having means for rotatably supporting and driving a workpiece to be ground, a work loading device comprising a shaft, a work supporting arm on said shaft having means for positively engaging and shifting a workpiece alternately in opposite directions, a fluid motor for rocking said arm in one direction to position said workpiece in predetermined operative relation with said work driving means, and after a grinding operation to rock said shaft in the opposite direction to remove a workpiece from operative relation with said work driving means.

16. In a grinding machine, a base, a grinding wheel support movable transversely on said base, a grinding wheel rotatably mounted on said support, a work table movable longitudinally on said base, a headstock on said table having means for rotatably supporting and driving a workpiece to be ground, a work loading device comprising a shaft oscillatably mounted on said table, a work supporting arm on said shaft, means on said arm for positively engaging a workpiece to shift said workpiece into operative position, a fluid motor on said table and connections between said motor and said shaft for oscillating said shaft to swing said arm in one direction to shift a workpiece into predetermined operative relation with said work driving means and to support said workpiece during a grinding operation.

References Cited in the file of this patent

UNITED STATES PATENTS

| 1,904,045 | Haas | Apr. 18, 1933 |
| 1,952,806 | Hyland | Mar. 27, 1934 |
| 1,964,937 | Dumser et al. | July 3, 1934 |
| 2,050,482 | Blood et al. | Aug. 11, 1936 |
| 2,356,226 | Delahan et al. | Aug. 22, 1944 |
| 2,678,521 | Flohr | May 18, 1954 |